US011318877B2

(12) United States Patent
Maekawa et al.

(10) Patent No.: US 11,318,877 B2
(45) Date of Patent: May 3, 2022

(54) VEHICLE LIGHT-ADJUSTING SYSTEM

(71) Applicant: TOYOTA BOSHOKU KABUSHIKI KAISHA, Aichi (JP)

(72) Inventors: Motoki Maekawa, Aichi (JP); Mitsutaka Sako, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/881,448

(22) Filed: May 22, 2020

(65) Prior Publication Data
US 2020/0377005 A1 Dec. 3, 2020

(30) Foreign Application Priority Data

May 29, 2019 (JP) .............................. JP2019-099881

(51) Int. Cl.
*B60Q 1/00* (2006.01)
*F21S 41/60* (2018.01)
*G06F 3/16* (2006.01)
*G06F 3/01* (2006.01)

(52) U.S. Cl.
CPC ............ *B60Q 1/0023* (2013.01); *F21S 41/60* (2018.01); *G06F 3/017* (2013.01); *G06F 3/167* (2013.01); *B60Q 2300/21* (2013.01)

(58) Field of Classification Search
CPC ........ B60Q 1/0023; B60Q 1/52; B60Q 1/503; B60Q 3/60; B60Q 3/80; B60J 3/04; G06F 3/013; G06F 3/167
See application file for complete search history.

(56) References Cited

U.S. PATENT DOCUMENTS 6,434,255 B1 * 8/2002 Harakawa ............. G06F 3/0304
382/103
7,791,785 B2 * 9/2010 Knafou ............. B32B 17/10504
359/275
8,970,696 B2 3/2015 Xiong
(Continued)

FOREIGN PATENT DOCUMENTS

JP 2009-151419 7/2009
JP 2015-222591 12/2015
(Continued)

OTHER PUBLICATIONS

Kaoning Hu et al., "Hand Pointing Estimation for Human Computer Interaction Based on Two Orthogonal-Views", International Conference on Pattern Recognition, Aug. 2010, pp. 3760-3763.

*Primary Examiner* — Tung X Le
(74) *Attorney, Agent, or Firm* — Greenblum & Bernstein, P.L.C.

(57) ABSTRACT

A vehicle light-adjusting system includes a light-adjusting member arranged in an incident portion into which an external light enters, a control unit that controls transmittance of the light-adjusting member, and an instruction detecting unit. The light-adjusting member is divided into a plurality of parts. The instruction detecting unit detects an instruction given by the occupant in a non-contact manner to the light-adjusting member by at least one of gesture and words. When the instruction detecting unit detects the instruction designating any one of the parts, the control unit adjusts an individual transmittance of the part corresponding to the instruction detected by the instruction detecting unit.

3 Claims, 14 Drawing Sheets

(56) References Cited

U.S. PATENT DOCUMENTS

| | | | |
|---|---|---|---|
| 10,955,970 B2* | 3/2021 | Shih | G06F 3/013 |
| 2012/0062736 A1 | 3/2012 | Xiong | |
| 2016/0129832 A1* | 5/2016 | Zakhem | B60K 35/00 |
| | | | 315/77 |
| 2018/0141414 A1* | 5/2018 | Lota | B60H 1/00985 |
| 2019/0331947 A1* | 10/2019 | Hagiwara | B32B 17/10458 |
| 2020/0001687 A1* | 1/2020 | Chow | B60J 3/0204 |
| 2020/0377014 A1* | 12/2020 | Maekawa | B60Q 3/60 |

FOREIGN PATENT DOCUMENTS

| | | |
|---|---|---|
| JP | 2017-102598 | 6/2017 |
| JP | 2017-159730 | 9/2017 |

* cited by examiner

Fig. 7

| STARTUP WORDS | TYPE | CORRESPONDING CONTROL |
|---|---|---|
| SHIELD LIGHT | TYPE 1 | FIRST CONTROL |
| DARKEN | | |
| TOO BRIGHT | | |
| DAZZLING | | |
| ... | | |
| NO LIGHT SHIELD | TYPE 2 | SECOND CONTROL |
| BRIGHTEN | | |
| TOO DARK | | |
| NOT VISIBLE | | |
| ... | | |
| ADJUST LIGHT | TYPE 3 | THIRD CONTROL |
| OPTIMALLY | | |
| MODERATELY | | |
| APPROPRIATELY | | |
| ... | | |
| ... | ... | ... |

VEHICLE LIGHT-ADJUSTING SYSTEM

CROSS-REFERENCE TO RELATED APPLICATION

The present disclosure relates to a vehicle light-adjusting system. This application is based on and claims the priority of Japanese Patent Application No. 2019-99881 filed on May 29, 2019, the entire contents of which are incorporated herein by reference.

BACKGROUND OF THE INVENTION

Japanese Laid-Open Patent Publication No. 2017-159730 discloses an example of a vehicle light-adjusting system. A light-adjusting device disclosed in Japanese Laid-Open Patent Publication No. 2017-159730 includes a light-adjusting unit that can form a low-light transmission region and adjust the width of the low-light transmission region, and a control unit that controls the light-adjusting unit. The control unit controls the light-adjusting unit such that the lower end of the width of the low-light transmission region is located at a position corresponding to the position of the finger detected by a finger detecting unit.

In a conventional vehicle light-adjusting system, when an occupant wants to give some kind of instruction to the system, the occupant needs to bring a finger into contact with or close to a very limited region. For example, an operation such as pressing a switch at a fixed position is required. Therefore, when the movement is restricted by wearing the seat belt or in other cases, it is often not easy for the occupant to perform the operation.

Furthermore, in the vehicle light-adjusting system disclosed in Japanese Laid-Open Patent Publication No. 2017-159730, the occupant can only instruct the lower end position or the upper end position of the width of the low-light transmission region. In other words, this system adopts an adjustment method in which one end of the low-light transmission region is set as a fixed end and only the position of the other end is instructed, and thus the low-light transmission region can be adjusted only in the width from the fixed end. Thus, there was a problem in terms of "free position adjustment".

The present disclosure has been made in view of the circumstances described above, and provides a vehicle light-adjusting system in which an occupant can more freely select a part where adjustment of transmittance is desired and the occupant can easily give an instruction. The present disclosure can be realized as the following modes.

SUMMARY OF THE INVENTION

A vehicle light-adjusting system including:
a light-adjusting member arranged in an incident portion which an external light enters;
an instruction detecting unit that detects an instruction given by an occupant in a non-contact manner to the light-adjusting member by at least one of gesture or words; and
a control unit that controls transmittance of the light-adjusting member.

In the vehicle light-adjusting system, the light-adjusting member is divided into a plurality of parts, and when the instruction detecting unit detects the instruction designating any one of the parts, the control unit adjusts an individual transmittance of the part corresponding to the instruction detected by the instruction detecting unit.

In the vehicle light-adjusting system of the present disclosure, the light-adjusting member is divided into a plurality of parts, and when the occupant gives an instruction designating any one of the parts, the individual transmittance of the part corresponding to the instruction can be adjusted. Therefore, the occupant can more freely select a part where the adjustment of transmittance is desired. Moreover, in the vehicle light-adjusting system according to the present disclosure, an instruction designating any part can be given in a non-contact manner by at least one of gesture and words, so that the occupant can easily give the instruction.

BRIEF DESCRIPTION OF THE DRAWINGS

FIG. 7 is an explanatory view explaining a correspondence relationship between a startup word, a type to which each word belongs, and a control associated with each word:

DETAILED DESCRIPTION

Here, a desirable example of the present disclosure will be described.

The vehicle light-adjusting system further includes a voice recognition unit that recognizes a voice uttered by the occupant. The instruction detecting unit starts detecting the instruction when the voice recognition unit recognizes a predetermined word.

According to this configuration, some or all the processes of the instruction detecting process by the instruction detecting unit can be kept stopped until the occupant utters a predetermined word, so that power consumption can be suppressed. Furthermore, when the occupant wants the instruction detecting unit to start detecting an instruction, the occupant merely needs to utter a predetermined word, and thus the occupant can easily start the detection of an instruction without involving complicated operation or a great change in posture.

In the vehicle light-adjusting system, the instruction detecting unit detects a direction in which the occupant's finger points, and the control unit adjusts the individual transmittance of the part located in the direction detected by the instruction detecting unit.

According to this configuration, the occupant can instruct the part whose individual transmittance is to be adjusted by pointing with the finger. Thus, the occupant can more easily give an instruction.

The vehicle light-adjusting system further includes an incidence state detecting unit that detects an incidence state of the external light with respect to the vehicle. In the vehicle light-adjusting system, after adjusting the individual transmittance of the part corresponding to the instruction detected by the instruction detecting unit, the control unit changes the part whose individual transmittance is to be adjusted according to a change in the incidence state detected by the incidence state detecting unit.

According to this configuration, even if the incidence state of the external light with respect to the vehicle changes after the individual transmittance of the part corresponding to the instruction of the occupant has been adjusted, the part whose individual transmittance is to be adjusted can be changed according to the change in the incidence state.

An embodiment of a vehicle 3 including a vehicle light-adjusting system 1 of the present disclosure will be described in detail with reference to the drawings.

Figure 1:
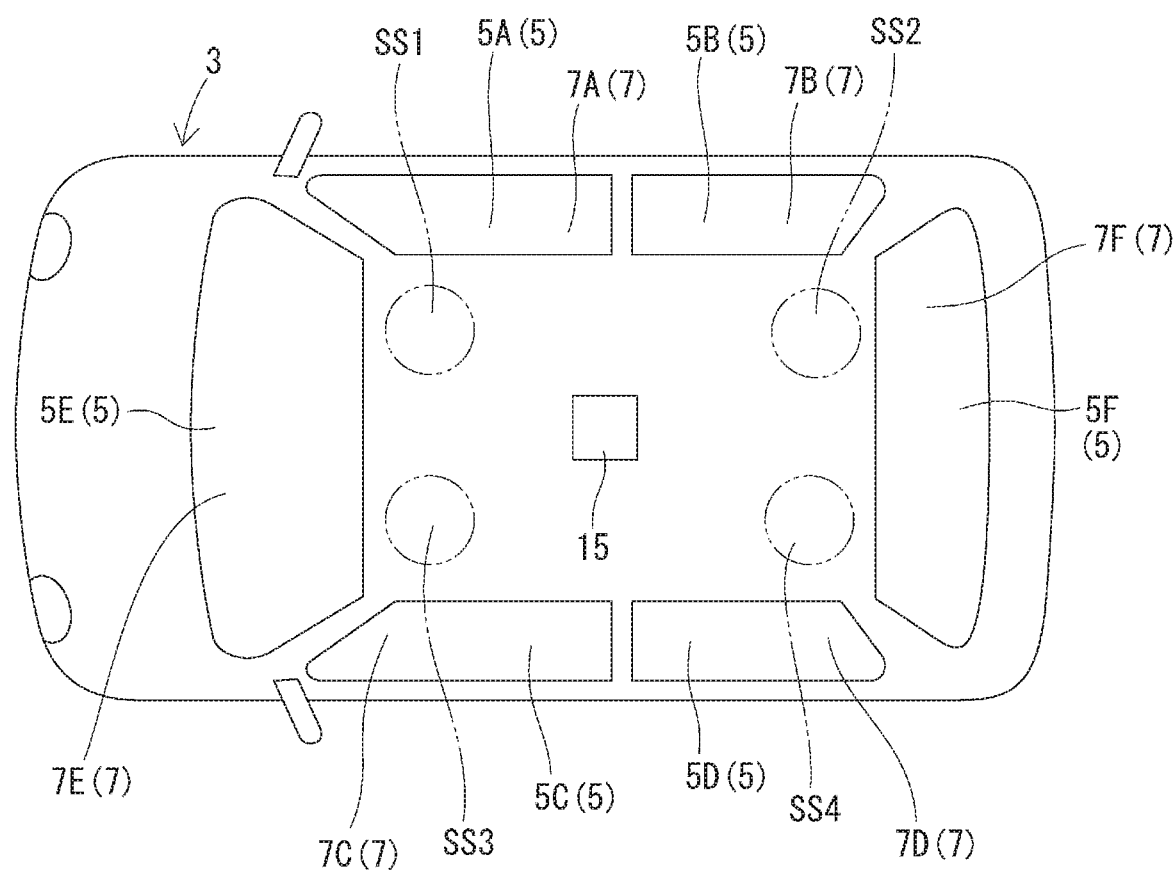
FIG. 1 is a schematic view of a vehicle 3 on which a vehicle light-adjusting system 1 is mounted, as viewed from vertically above.
Figure 2:
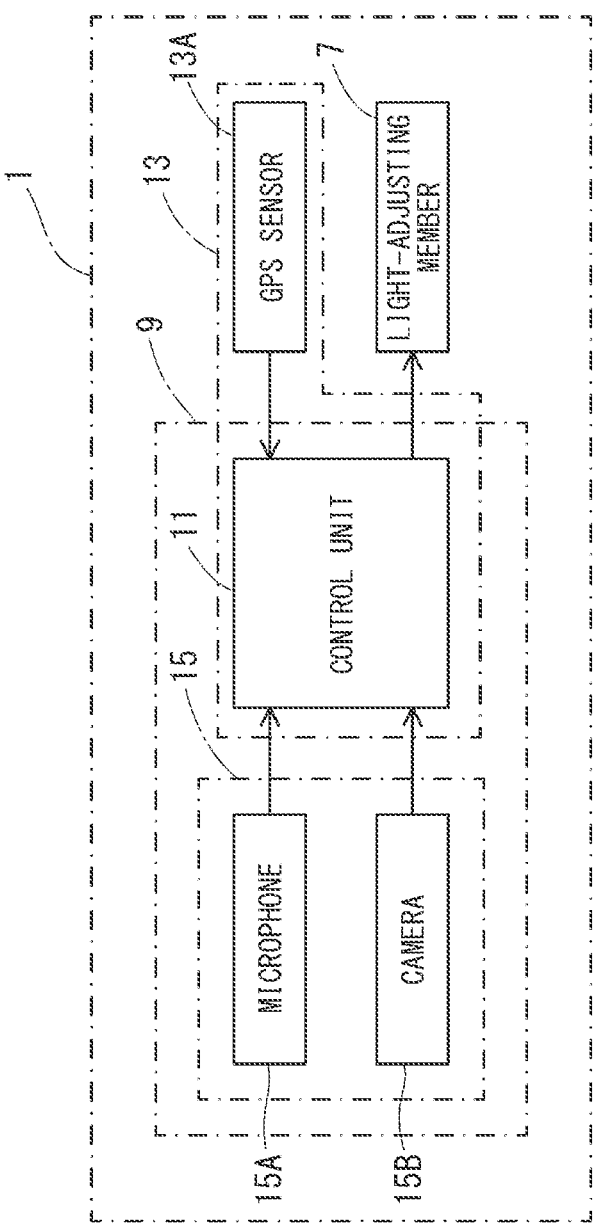
FIG. 2 is a block diagram showing the overall configuration of the vehicle light-adjusting system 1.

FIG. 1 is a schematic view of a vehicle 3 on which a vehicle light-adjusting system 1 is mounted, as viewed from vertically above. FIG. 2 is a block diagram showing an overall configuration of the vehicle light-adjusting system 1.

The vehicle light-adjusting system 1 includes an incident portion 5 which external light enters, a light-adjusting member 7 arranged in the incident portion 5, and a control unit 11 (ECU (Electronic Control Unit)). The control unit 11 includes a CPU (Central Processing Unit), a memory (e.g., a ROM (Read Only Memory), a RAM (Random Access Memory)), and the like. The control unit 11 controls the transmittance of the light-adjusting member 7. The vehicle light-adjusting system 1 includes an information acquiring unit 15 that acquires information on a predetermined object in the interior. The control unit 11 is capable of communicating information with the information acquiring unit 15 in a wired or wireless manner. The control unit 11 is capable of communicating information with the light-adjusting member 7 in a wired or wireless manner.

Although illustration is omitted, the system may also include an operation input unit such as an operation key and an operation button for receiving an operation from an occupant such as a driver.

The vehicle 3 is provided with seats SS1, SS2, SS3, and SS4. The seat SS1 is a driver's seat. The occupant in the seat SS1 is a driver of the vehicle 3.

The incident portion 5 which the external light enters is, specifically, a front-seat side-window 5A on the driver's seat side, a rear-seat side-window 5B on the driver's seat side, a front-seat side-window 5C on a passenger's seat side, a rear-seat side-window 5D on the passenger's seat side, a front window 5E, and a rear window 5F. A roof window (not shown) may be further provided as the incident portion 5.

The light-adjusting member 7 is arranged on substantially the entire surface of the front-seat side-window 5A, the rear-seat side-window 5B, the front-seat side-window 5C, the rear-seat side-window 5D, the front window 5E, and the rear window 5F.

More specifically, the light-adjusting member 7 is attached from the vehicle interior side to a glass plate, which is an example of a transparent plate material constituting the front-seat side-window 5A, the rear-seat side-window 5B, the front-seat side-window 5C, the rear-seat side-window 5D, the front window 5E, and the rear window 5F. The light-adjusting member 7 may be attached from the vehicle exterior side, or may be sandwiched between glass plates of laminated glass of each window by way of an intermediate film.

Each of the light-adjusting members 7 arranged in the front-seat side-window 5A, the rear-seat side-window 5B, the front-seat side-window 5C, the rear-seat side-window 5D, the front window 5E, and the rear window 5F is divided into a plurality of parts 41. Here, the light-adjusting member 7A of the front-seat side-window 5A will be specifically described. The same applies to the structures of the other windows, the rear-seat side-window 5B, the front-seat side-window 5C, the rear-seat side-window 5D, front window 5E, and the rear window 5F.

Figure 3:
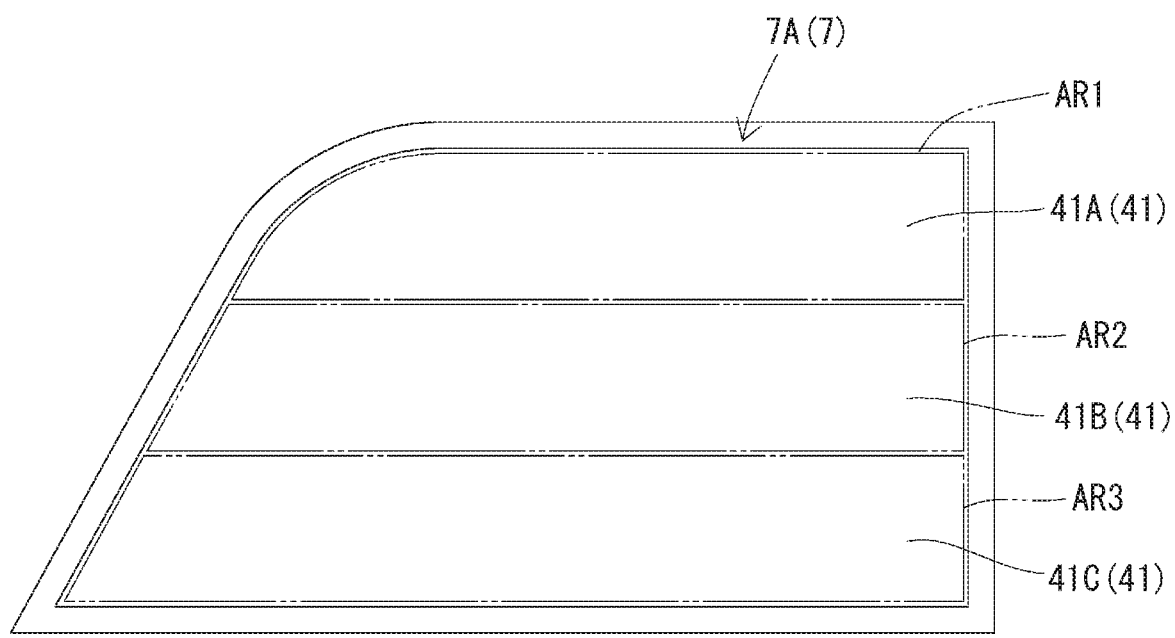
FIG. 3 is an explanatory view showing a light-adjusting member 7A of a front-seat side window 5A.

FIG. 3 schematically shows the light-adjusting member 7A of the front-seat side window 5A as an example of the light-adjusting member 7. The light-adjusting member 7 is divided into a plurality of parts 41, and in the example of FIG. 3, is divided into three parts 41A, 41B, and 41C arranged in an upper region AR1, an intermediate region AR2, and a lower region AR3, respectively. The three parts 41A, 41B, 41C are arranged vertically with a horizontal linear boundary between the parts 41A, 41B and a horizontal linear boundary between the parts 41B. 41C.

The control unit 11 can adjust the individual transmittance of each part 41.

Figure 4:
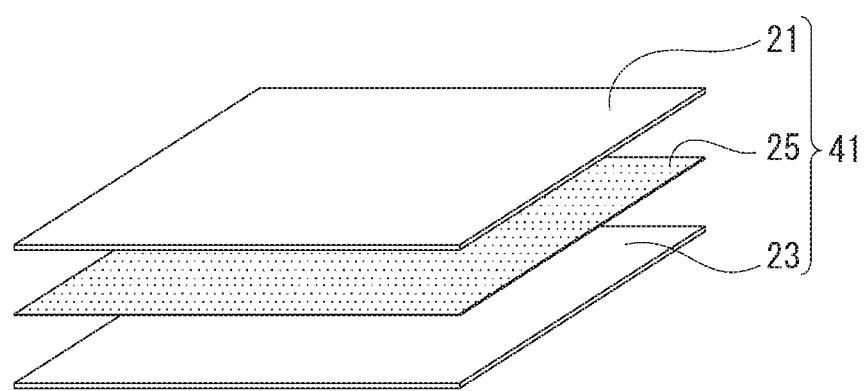
FIG. 4 is an exploded perspective view showing a part 41 of the light-adjusting member 7.
Figure 5:
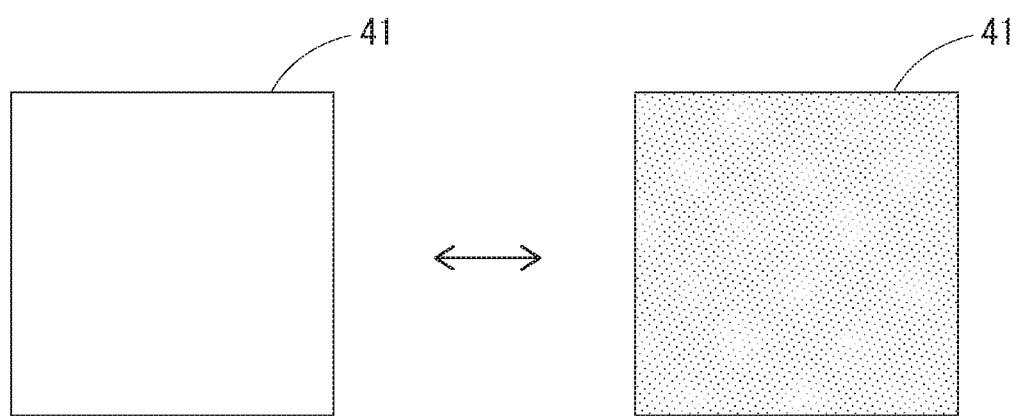
FIG. 5 is an explanatory view showing change in transmittance of the part 41 of the light-adjusting member 7.

As shown in FIG. 4, in each part 41 of the light-adjusting member 7, a light-adjusting film 25 is disposed between a first electrode 21 and a second electrode 23, and the transmittance is changed by a voltage applied in between the first electrode 21 and the second electrode 23. For example, each part 41 becomes transparent or high transmittance when voltage is applied as shown in the left figure of FIG. 5, and becomes opaque or low transmittance when no voltage is applied as shown in the right figure of FIG. 5. FIGS. 4 and 5 conceptually show the part 41 and the portion constituting the part 41. The outer edge shape of each part 41 is not limited to a square but may take various shapes. That is, the outer edge shape of each part 41 can be made to various shapes in accordance with the part to be arranged.

As the light-adjusting film 25, there is suitably exemplified (1) a light-adjusting film 25 using an EC (Electro Chromic) method, (2) a light-adjusting film 25 using an SPD (Suspended Particle Device) method, (3) a light-adjusting film 25 using liquid crystals of VA (Vertical Alignment) method, TN (Twisted Nematic) method or IPS (In-Place-Switching) method.

The light-adjusting film 25 using the EC method has a structure in which a light-adjusting layer (electrolyte layer) is sandwiched between a pair of electrodes. The color of the light-adjusting layer changes between transparent and dark blue according to the potential difference between the electrodes using the oxidation-reduction reaction.

The light-adjusting film 25 using the SPD method is usually colored dark blue using the orientation of fine particles, but changes to transparent when voltage is applied, and returns to the original dark blue when the voltage is turned off. Thus, light and shade can be adjusted by the voltage.

Further, the light-adjusting film 25 using a PDLC (Polymer Dispersed Liquid Crystal) method may be used. The light-adjusting film 25 using the PDLC method has a network structure made of a special polymer formed in the liquid crystal layer, wherein a state in which an array of liquid crystal molecules is irregular is induced by the action of the polymer network, so that light is scattered. When a voltage is applied to array the liquid crystal molecules in the direction of the electric field, light is not scattered so that a transparent state is obtained.

The information acquiring unit 15 is constituted of a sensor group including various sensors that acquire information on a predetermined object. Examples of the predetermined object include an occupant and various members in the interior. Although the information is not particularly limited, the brightness of the predetermined object, the temperature of the predetermined object, the number of blinks, and the diameter of the pupil of the eye are preferably exemplified.

The sensor group includes a microphone 15A for recognizing voice, a camera 15B for acquiring image information of the interior, and the like. The microphone 15A has a function of generating an electric signal corresponding to the voice of each occupant. In the present configuration, the information acquiring unit 15 including the microphone 15A corresponds to an example of a voice recognition unit. The camera 15B is configured to be capable of sensing the state of the object.

The control unit 11 has a function of controlling the transmittance of the light-adjusting member 7. The control unit 11 determines a light-shielding part that shields light and a non-light-shielding part that does not shield light among the plurality of parts 41, and adjusts the transmittance of the light-shielding part at least. When the transmittance is adjusted in two stages, the transmittance of the light-shielding part is adjusted to within a first range, and the transmittance of the non-light-shielding part is adjusted to within a second range. For example, the transmittance of visible light (e.g., wavelength of 380 nm to 750 nm) of the light-shielding part is adjusted to be within the first range (e.g., 0 to 30%), and the transmittance of visible light of the non-light-shielding part is adjusted to be within the second range (e.g., 70 to 100%). When the adjustment is thus performed in two stages, the first range, which is the transmittance of the visible light of the light-shielding part, is smaller than the second range, which is the transmittance of the visible light of the non-light-shielding part (first range<second range). The above-described adjustment performed in two stages is merely an example. The transmittance of the light-shielding part may be changed in multi-stages of two or more stages, or continuously, by changing the potential difference between the electrodes.

The term "light-shielding" as used in the present specification means not only completely shielding light but also weakening the transmission of light (specifically, suppressing the transmittance of light to be less than a reference transmittance (e.g., transmittance of the second range).).

The instruction detecting unit 9 includes a control unit 11 and an information acquiring unit 15. The instruction detecting unit 9 detects an instruction given by the occupant in a non-contact manner to the light-adjusting member 7 by at least one of gesture and words. The "instruction detecting operation" performed by the instruction detecting unit 9 will be described later in detail.

The incidence state detecting unit 13 is constituted of the control unit 11 and a GPS sensor 13A, and detects an incidence state of an extrenal light to the vehicle 3.

The GPS sensor 13A is constituted of a known GPS receiver, and is configured to receive information from a GPS satellite (not shown), and calculate the current position (detailed latitude and longitude) of the vehicle 3 provided with the GPS sensor 13A. The GPS sensor 13A may be of any known type as long as the GPS sensor 13A can grasp the current position of the vehicle 3 based on information from the GPS satellite.

The incidence state detecting unit 13 detects an azimuth to which the vehicle 3 is directed by a known method based on the information on the current position of the vehicle 3 monitored by the GPS sensor 13A. That is, the incidence state detecting unit 13 continuously detects the current position of the vehicle 3 by the GPS sensor 13A, and continuously detects the azimuth to which the vehicle 3 is directed based on the information on the current position detected in such a manner. Furthermore, the incidence state detecting unit 13 has a clock function and a calendar function so that date and time can be specified, and specifies the azimuth of the sun when the vehicle 3 is set as a reference based on the date and time.

Figure 11:
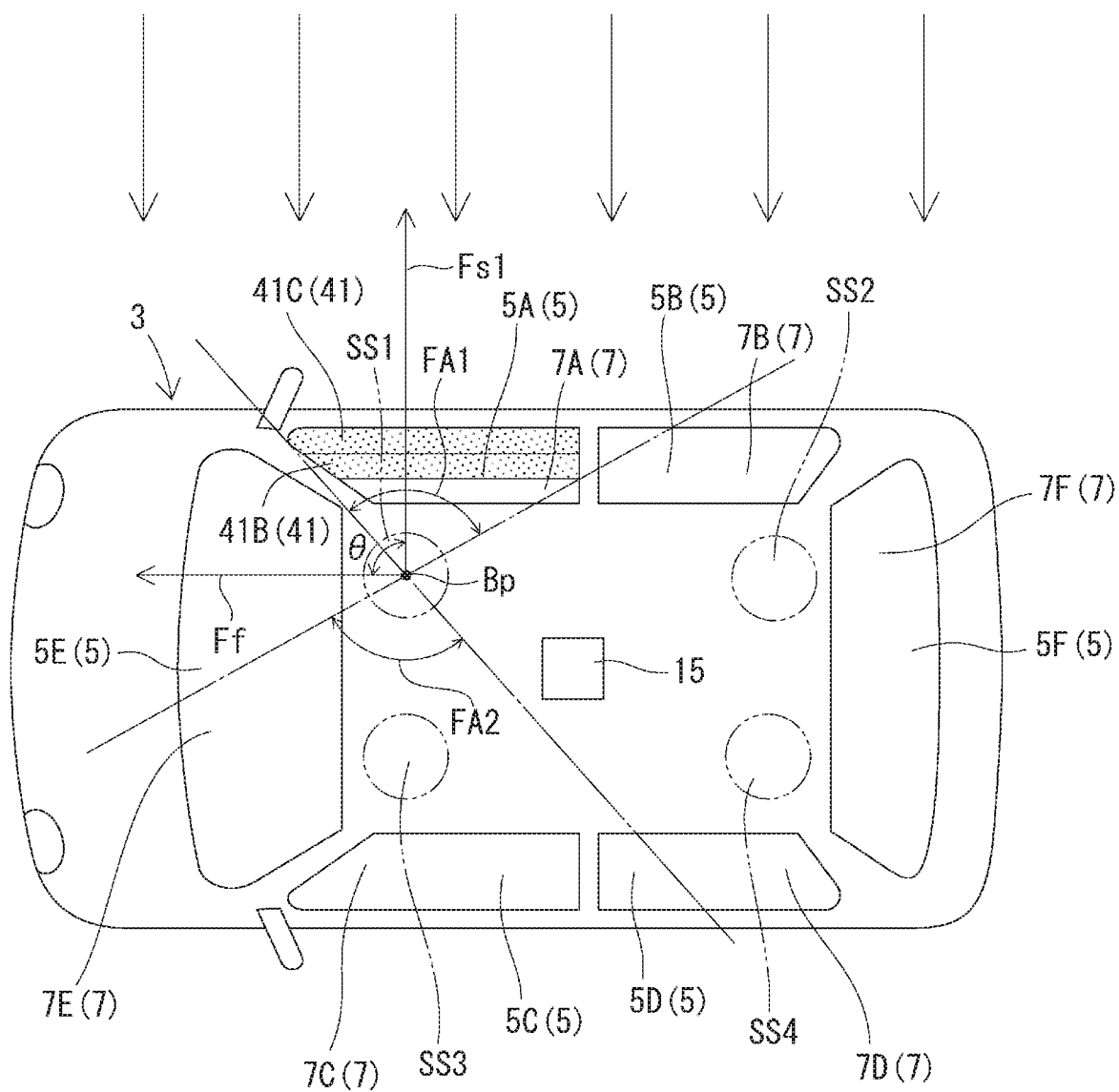
FIG. 11 is an explanatory view explaining an incidence state (incident direction) with respect to a vehicle 3.

The incidence state detecting unit 13 specifies the azimuth to which the vehicle 3 is directed and the azimuth of the sun with the vehicle 3 as a reference, and then specifies "the direction of incidence of the sunlight with respect to the vehicle 3" as an example of the incidence state of the external light with respect to the vehicle 3. Here, "the direction of incidence of sunlight with respect to the vehicle 3" means the direction of sunlight entering the vehicle 3 when there is no obstacle shielding the sunlight at the periphery of the vehicle 3. Specifically, as shown in FIG. 11, an angle between the reference direction (the direction Ff in FIG. 11 which is the forward direction) and the azimuth of the sun (the direction Fs1 in FIG. 11) as viewed from a reference position Bp in the vehicle 3 (the angle when clockwise direction is positive direction, that is, angle $\theta$ in FIG. 11) can be assumed as "the direction of incidence of sunlight with respect to the vehicle 3".

In the representative examples described above and below, the direction $\theta$ in the horizontal direction of the sunlight entering the vehicle 3 is specified without consideration of the altitude of the sun. However, the direction in the height direction may be specified in consideration of the altitude of the sun.

Figure 6:
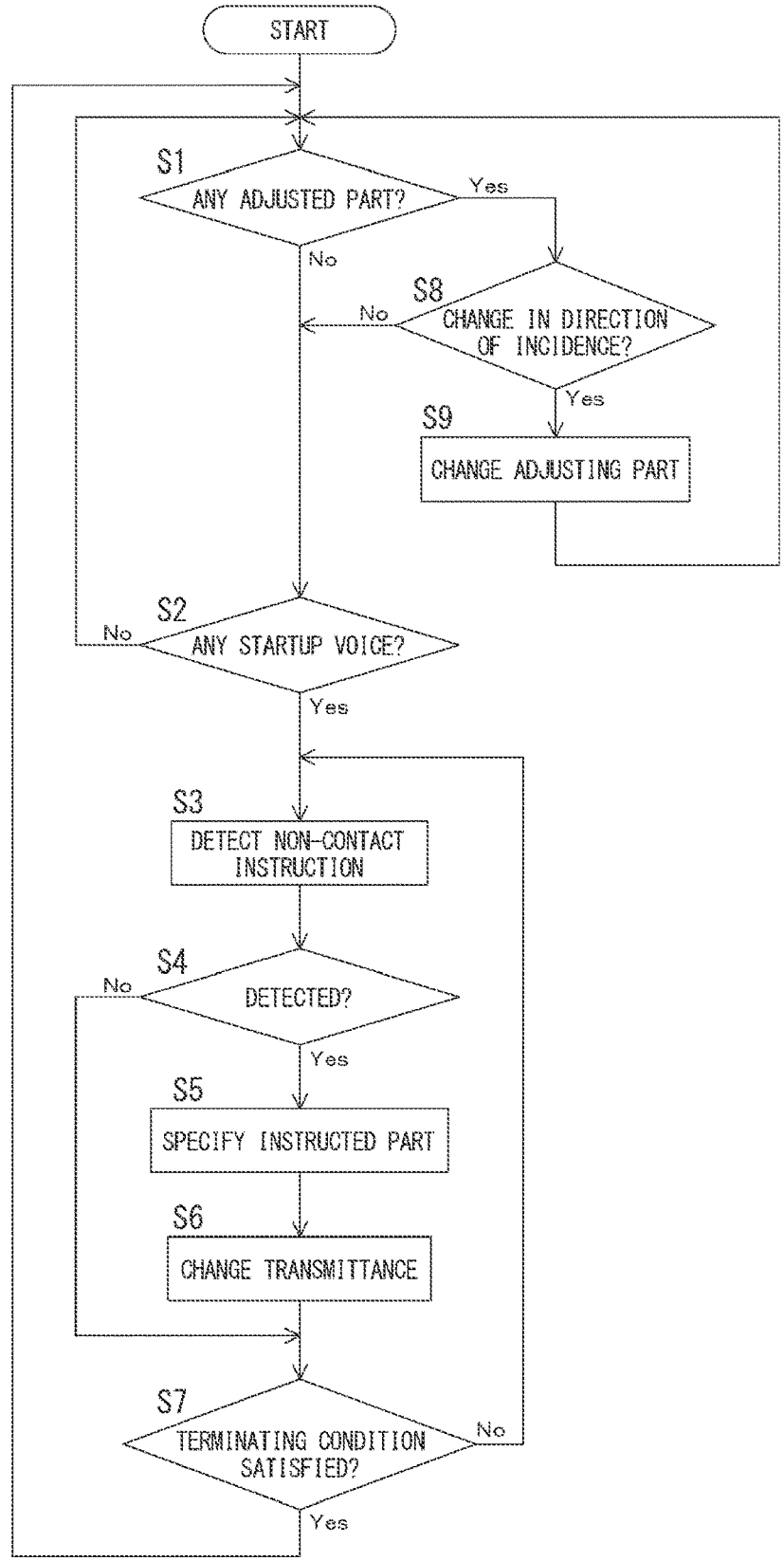
FIG. 6 is a flowchart illustrating a flow of a light-adjusting control performed in the vehicle light-adjusting system 1.

FIG. 6 is a flowchart illustrating a flow of light-adjusting control performed in the vehicle light-adjusting system 1. An operation program for executing the light-adjusting control is stored in, for example, a ROM in the control unit 11, and is executed by a CPU provided in the control unit 11.

The control unit 11 starts the light-adjusting control of FIG. 6 when the control start condition is satisfied. The control start condition may be, for example, "the vehicle has been started" due to pressing of a start switch of the vehicle, or may be "the power of the control unit 11 has been turned on".

When the light-adjusting control in FIG. 6 is started, the control unit 11 determines in step S1 whether or not there is a part already adjusted as a light-shielding part. In step S1, the control unit 11 determines whether or not the transmittance of any part 41 of the plurality of light-adjusting members 7 present in the vehicle 3 has been adjusted to be out of the second range (the range of the transmittance of the non-light-shielding part). When determining in step S1 that the transmittances of all the parts 41 of all the light-adjusting members 7 are in the second range (the range of the transmittance of the non-light-shielding part), that is, when determining as "No" in step S1, the control unit 11 performs the process of step S2. When determining in step S1 that the transmittance of any part 41 has been adjusted to be out of the second range, that is, when determining as "Yes" in step S1, the control unit 11 performs the process of step S8.

After determining as "No" in the process of step S1 or determining as "No" in the process of step S7 described later, the control unit 11 performs the process of step S2 to determine whether or not there is a startup voice.

The startup voice is a voice that utters a predetermined word. That is, in the process of step S2, the control unit 11 determines whether a "predetermined word" has been input to the microphone 15A. Various words can be registered as candidates for the "predetermined word".

In a specific example, as shown in FIG. 7, a plurality of startup words are registered in advance, and the startup words are classified into a plurality of types. A plurality of words that trigger the first control (control to lower the transmittance) are registered in advance as the type 1 startup word, for example, words such as "light shielding", "darken", "too bright", and "dazzling". A plurality of words that trigger the second control (control to increase the transmittance) are registered in advance as the type 2 startup word, for example, words such as "no light shielding", "brighten", "too dark", and "not visible". A plurality of words that trigger the third control (control to appropriate brightness) are registered in advance as the type 3 startup word, for example, words such as "adjust light", optimally". Other types of startup words than types 1 to 3 may be registered.

In step S2 of the control of FIG. 6, the control unit 11 determines whether or not a voice that utters any of the "startup words" registered in advance is detected, and proceeds the process to step S3 when determining that the voice that utters any of the startup words is detected. When determining in step S2 that the voice that utters the "startup word" is not detected, the control unit 11 returns the process to step S1, and again performs the processes of step S1 and subsequent steps. In other words, while there is no part already adjusted as the light-shielding part and the voice that utters the "startup word" is not detected, a standby state in which the determinations in steps S1 and S2 are repeated is maintained.

When determining in step S2 that the startup voice (the voice that utters the startup word) is detected, the control unit 11 performs the process of detecting a "non-contact instruction" in step S3. The non-contact instruction is an instruction designating a part to be adjusted out of a plurality of parts 41 (see FIG. 3) in a non-contact manner, and specifically, it is an "instruction designating a part to be adjusted by pointing with a finger".

When executing the process of step S3, the control unit 11 analyzes an image captured by the camera 15B (FIG. 2) and detects an "image of a finger". The image capturing by the camera 15B may be started when determined as "Yes" in step S2, or may be started when the control in FIG. 6 is started. The camera 15B shown in FIG. 2 may be constituted of a single image sensor, but more desirably, may be configured to include a plurality of image sensors in order to perform analysis with high accuracy.

When detecting an image of a finger in step S3, the control unit 11 extracts a finger image from the captured image using a known finger direction recognition technique. Furthermore, the control unit 11 analyzes the extracted finger image and detects the direction pointed by the finger in the space in the vehicle 3 (FIG. 1).

In this configuration, three-dimensional coordinates having a predetermined position as the origin in the space inside the vehicle 3 are defined, and the coordinates of each position in the internal space of the vehicle 3 can be specified. Then, by analyzing the captured image generated by the camera 15B, the coordinates (the three-dimensional coordinates in the internal space of the vehicle 3) of each position, such as the end and the corner, of the object captured by the camera 15B can be specified.

Figure 8:
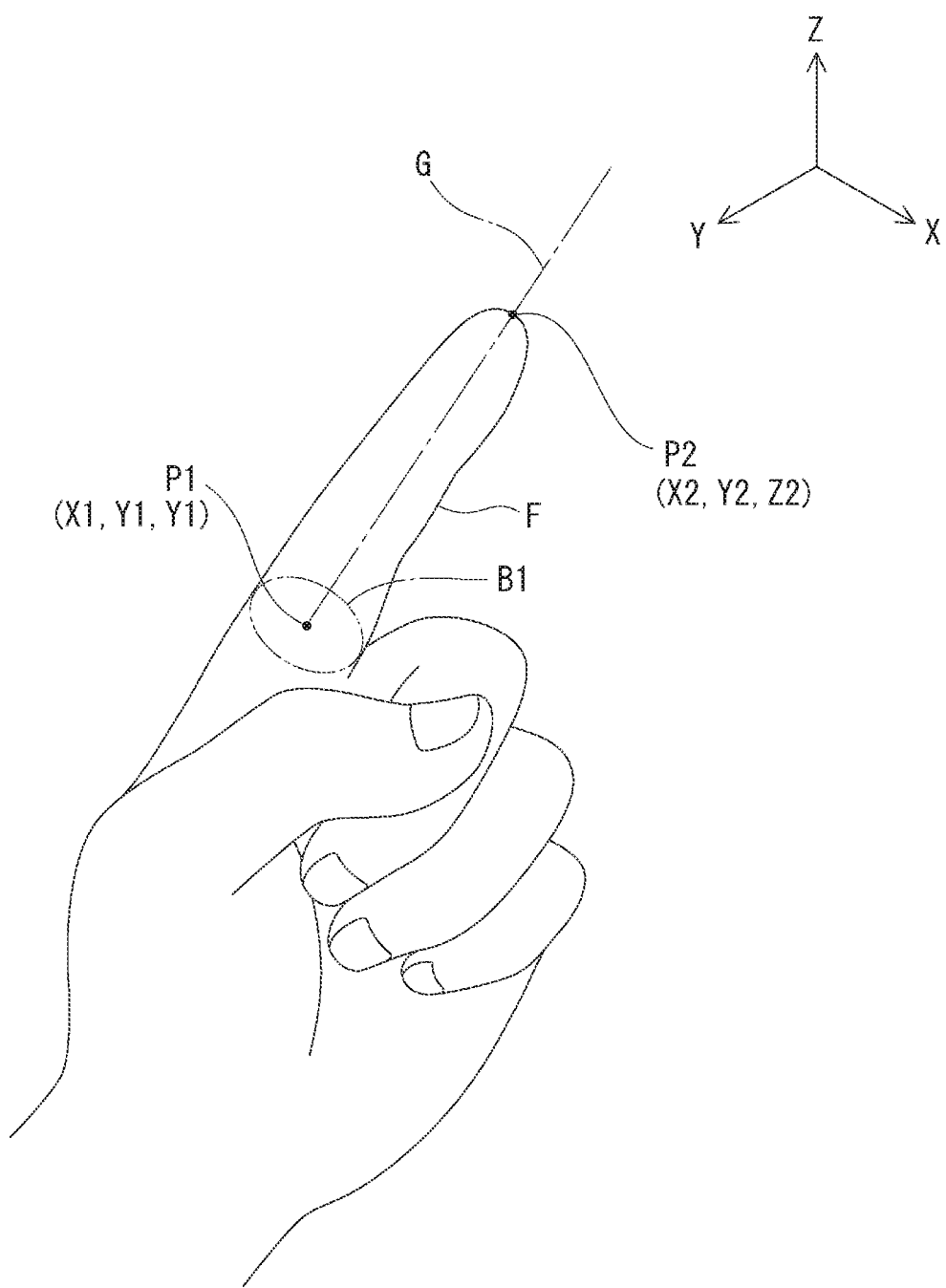
FIG. 8 is an explanatory view explaining an example of a detection method for detecting a direction in which an occupant's finger points.

When the captured image as shown in FIG. 8 is obtained by the camera 15B (FIG. 2) in step S3, the control unit 11 analyzes the captured image and extracts an image region of the finger F. Then, the coordinate P2 of the tip of the finger F is detected by a known tip extraction method, and the direction (vector) to which the finger F is directed is detected using a known finger direction recognition technique. The method of specifying the image region of the finger F, the method of specifying the tip position of the finger, the method of specifying the proximal end position of the finger, and the method of specifying the direction of the finger may adopt known methods, for example, the methods described in Japanese Laid-Open Patent Publication No. 2017-102598, Japanese Laid-Open Patent Publication No. 2009-151419, and Japanese Laid-Open Patent Publication No. 2015-222591 as well as the method described in 'Kaoning Hu, et al. "Hand Pointing Estimation for Human Computer Interaction Based on Two Orthogonal-Views" ICPR'10 Proceeding of the 2010 20th International Conference on Pattern Recognition'.

For example, in the captured image of FIG. 8, the tip side from the boundary position B1, which is the proximal end (root) of the finger, is the image region of the finger F. The control unit 11 can extract the tip side from the boundary position B1 as the image region of the finger by a known method. Furthermore, the control unit 11 can detect the coordinates P1 (X1, Y1, Z1) of the central position of the proximal end of the finger F and the coordinates P2 (X2, Y2, Z2) of the tip of the finger F, and detect the direction (the direction of axis G) passing through the coordinate P1 and the coordinate P2 as the direction to which the finger F is directed.

After determining as "Yes" in step S2 of the control in FIG. 6, the control unit 11 attempts the process of step S3 described above, and thereafter, determines in step S4 whether a non-contact instruction is detected. Specifically, in the determination of step S4, the control unit 11 determines whether or not the direction to which the finger is directed is specified in the process in step S3. The control unit 11 proceeds the process to step S5 when determining that the direction to which the finger is directed is specified, and proceeds the process to step S7 when determining that the direction to which the finger is directed is not specified.

Figure 9:
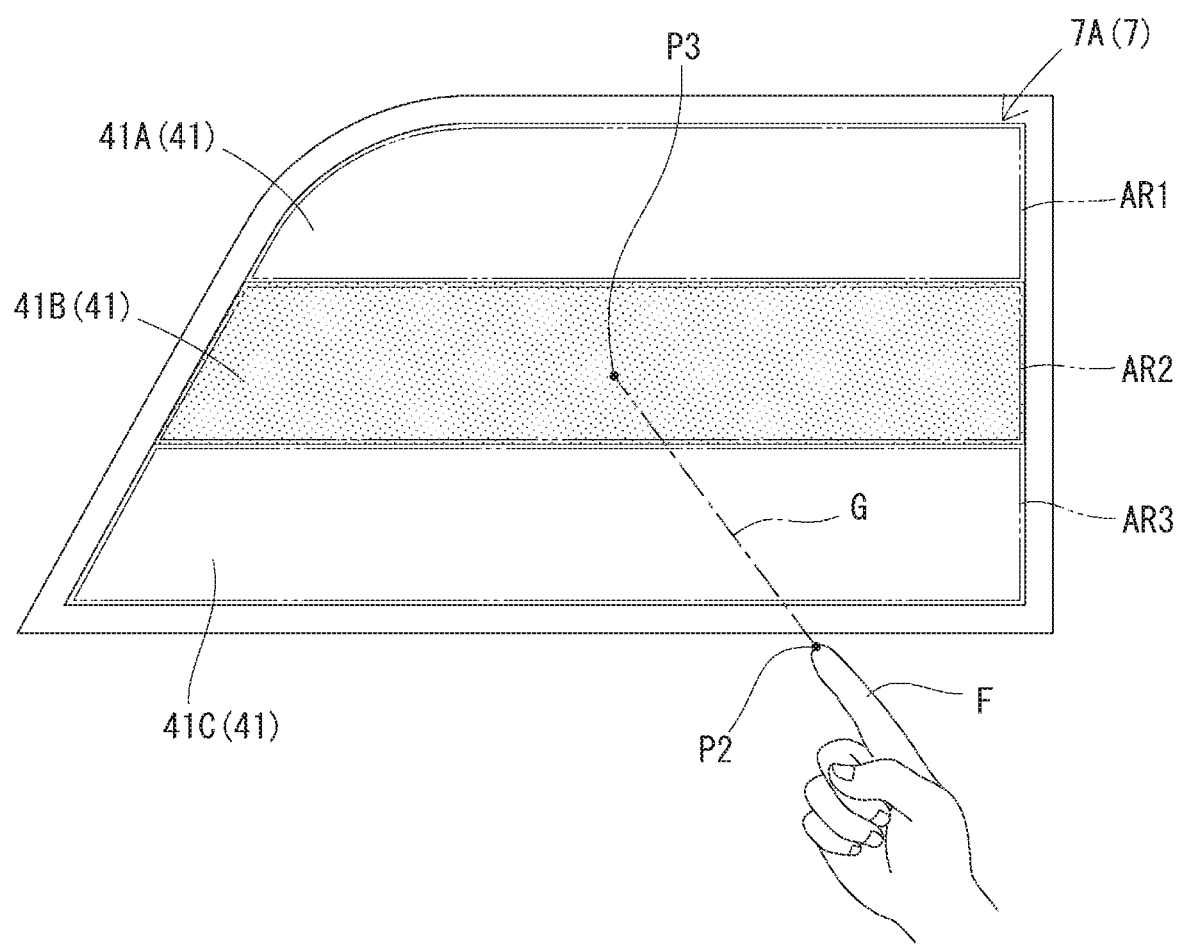
FIG. 9 is an explanatory view illustrating a state in which the individual transmittance of some parts 41 are adjusted based on the direction in which the occupant's finger points.

When determining in step S4 that the non-contact instruction is detected (when determining that the direction to which the finger is directed is specified), the control unit 11 specifies in step S5 the instructed part designated in the non-contact instruction. Specifically, in step S5, the control unit 11 specifies, as the instructed part, a part in the direction of the finger detected in step S3 among all the parts 41 of all the light-adjusting members 7. For example, in a case where the direction G in which the finger F points is specified as shown in FIG. 8, if the part 41B of the light-adjusting member 7A exists at the position P3 on the extension of the direction G as shown in FIG. 9, such part 41B is specified as the instructed part.

After specifying the instructed part in step S5, the control unit 11 changes the transmittance of the instructed part in step S6. When executing the process of step S6, the control unit 11 performs the control method associated with the type to which the word determined as "startup voice" in step S2 belongs.

For example, when the voice of the word "too bright" is recognized and it is determined in step S2 that there is startup voice, the control unit 11 performs in step S6 the first control (control for lowering the transmittance) associated with the type 1 (FIG. 7) to which the word "too bright" belongs. In this case, the first control (control for lowering the transmittance) may be a control for setting the transmittance of the designated part specified in step S5 to the first range described above, or in a configuration where the range of the transmittance is defined in a multiple stages, the first control may be a control for setting the transmittance of the designated part to one stage lower than the current transmittance. FIG. 9 is an example of a case where the transmittance of the designated part is changed to be low by such control.

Alternatively, when the voice of the word "too dark" is recognized and it is determined in step S2 that there is a startup voice, the control unit 11 performs in step S6 the second control (control for increasing the transmittance) associated with the type 2 (FIG. 7) to which the word "too dark" belongs. In this case, the second control (control for increasing the transmittance) may be a control for setting the transmittance of the designated part specified in step S5 to the second range described above, or in a configuration where the range of the transmittance is defined in a multiple stages, the second control may be a control for setting the transmittance of the designated part to one stage higher than the current transmittance.

Alternatively, when the voice of the word "optimally" is recognized and it is determined in step S2 that there is a startup voice, the control unit 11 performs in step S6 the third control (control for obtaining an appropriate brightness) associated with the type 3 (FIG. 7) to which the word "optimally" belongs. In this case, for example, the illuminance at a predetermined position in the internal space of the vehicle 3 is detected by an illuminance sensor (not shown), and if the detected illuminance is within a reference range, the transmittance of the designated part specified in step S5 is not changed. If the detected illuminance exceeds the reference range, a control for lowering the transmittance of the designated part is performed. If the detected illuminance does not reach the reference range, a control for increasing the transmittance of the designated part is performed. The control for lowering the transmittance may be a control for setting the transmittance to the first range, or in a configuration where the range of the transmittance is defined in multiple stages, the control for lowering the transmittance may be a control for lowering the transmittance to one stage lower than the current transmittance. The control for increasing the transmittance may be a control for setting the transmittance to the second range, or in a configuration where the range of the transmittance is defined in multiple stages, the control for increasing the transmittance may be a control for increasing the transmittance to one stage higher than the current transmittance.

When it is determined in step S4 that the non-contact instruction is not detected and the process is proceeded to step S7, or when the process of step S6 is terminated, the control unit 11 determines in step S7 whether or not the terminating condition is satisfied. The terminating condition may be, for example, a condition that "a constant time has elapsed since it has been determined in step S2 that there is a startup voice", or may be a condition that a predetermined terminating instruction has been made (e.g., the word "terminate" has been uttered). When determining in step S7 that the terminating condition is satisfied, the control unit 11 returns the process to step S, and again performs the processes of step S1 and subsequent steps.

Figure 10:
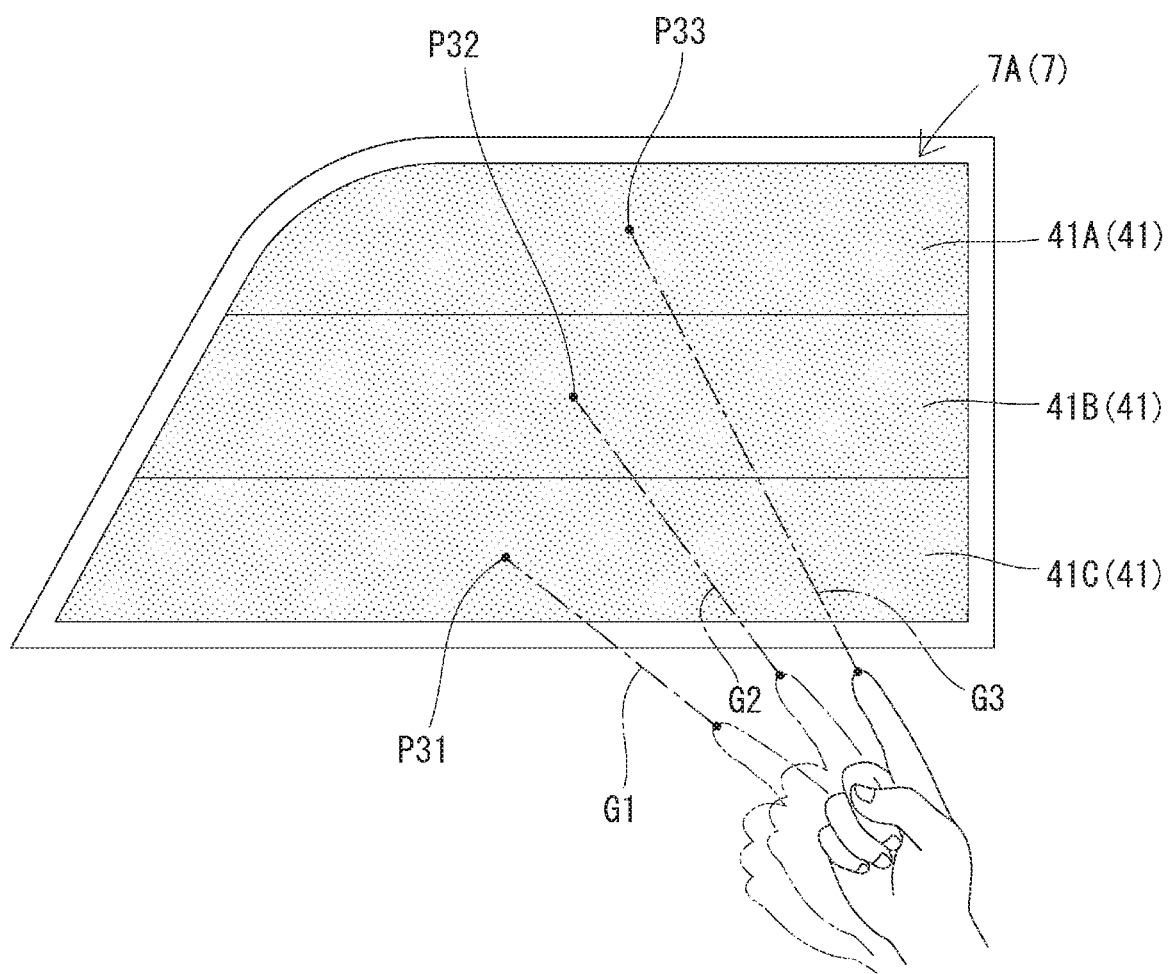
FIG. 10 is an explanatory view illustrating a state in which the individual transmittances of a plurality of parts 41 are adjusted when the direction in which a finger points is changed to a plurality of directions.

When determining in step S7 that the terminating condition is not satisfied, the control unit 11 returns the process to step S3, and again performs the processes of step S3 and subsequent steps. Thus, when the terminating condition is not satisfied, the process is returned to step S3, and if the non-contact instruction is detected again in step S3, the processes of steps S5 and S6 are performed again. Therefore, for example, as shown in FIG. 10, after the position P31 is pointed by the direction G1 of the finger in the first non-contact instruction so that the transmittance of the part 41C has been changed to be low, when the direction of the finger is changed to G2, G3 consecutively so that the positions P32, P33 are consecutively pointed until the terminating condition is satisfied, the transmittances of the parts 41B and 41A are also changed.

Next, a process when it is determined as "Yes" in step S1 will be described.

When determining in step S1 that "there is a part already adjusted as the light-shielding part", that is, when determining that the transmittance of any part 41 is adjusted to be out of the second range, the control unit 11 performs the process of step S8.

In step S8, the control unit 11 determines whether or not "the direction of incidence of sunlight with respect to the vehicle 3" has changed by equal to or greater than a predetermined degree from a time point when "the most recent process of step S6 or step S9" (hereinafter also referred to as "the most recent process") is performed.

Specifically, at each time point of steps S6, S9, the control unit 11 specifies "the direction of incidence of sunlight with respect to the vehicle 3" at each time point based on the azimuth to which the vehicle 3 is directed and the azimuth of the sunlight, and specifies "the direction of incidence of sunlight with respect to the vehicle 3" also at the time point of step S8. In the determination of step S8, the control unit 11 determines whether or not a change angle, which is obtained in comparison between "the direction of incidence of sunlight with respect to the vehicle 3" specified at the time point of step S8 and "the direction of incidence of sunlight with respect to the vehicle 3" specified at the time point of the most recent process, is equal to or greater than a predetermined angle. When determining that the change angle is equal to or greater than a predetermined angle, the adjusting part is changed in step S9, and when the change angle is not equal to or greater than a predetermined angle, the process proceeds to step S2.

When changing the adjusting part in step S9, the control unit 11 specifies a range in the direction in which the target part (the part already adjusted as the light-shielding part at a time point immediately before step S9) exists when a reference position is set as a reference. The reference position is, for example, a predetermined position in a driver's seat. Then, the "range in the direction after change", which is obtained by changing the "range in the existing direction" by the change angle, is specified. Then, among the parts existing in the "range in the direction after change" specified in this manner, a part that does not satisfy the exclusion condition is determined as an adjusting target. A part that satisfies the exclusion condition is, for example, "a part whose area of a predetermined ratio (e.g., equal to or greater than 50%) is not included in the range in the direction after change", "a part arranged on a front glass", "a part that is not at the same height as the target part", and the like. A part that does not satisfy the exclusion condition is a part that does not satisfy all of these conditions. Then, the transmittance of the part determined as the adjusting target is made the same as the transmittance of the target part. The transmittance of the target part may be changed to the second range described above, or may not be changed.

Figure 12:
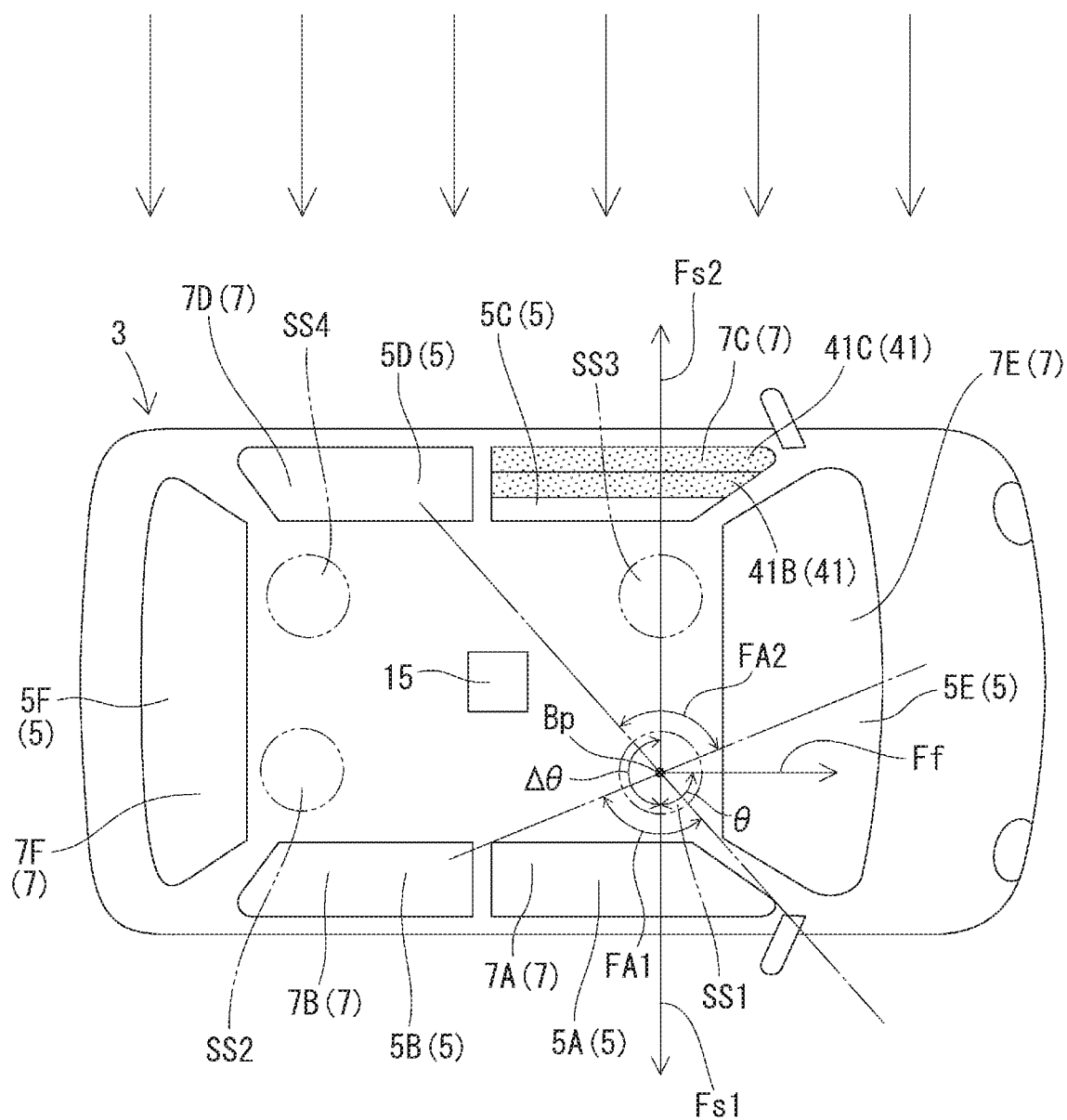
FIG. 12 is an explanatory view explaining a case where an incidence state (incident direction) with respect to the vehicle 3 is changed from the state in FIG. 11.

Here, a specific description will be given with reference to FIGS. 11 and 12. FIG. 11 illustrates the case where the angle made between the reference direction Ff of the vehicle 3 and the azimuth of the sunlight (e.g., south) is θ, that is, the direction of incidence of sunlight with respect to the vehicle 3 (in the horizontal direction) is θ. In FIG. 11, the direction of sunlight as viewed from the reference position Bp is indicated by Fs1. FIG. 12 shows the state in which only the direction of the vehicle 3 (the direction of the reference direction Ff) is changed while the azimuth of the sunlight is not changed from the azimuth in FIG. 11 (e.g., south). In FIG. 12, the direction of the sunlight as viewed from the reference position Bp is indicated by Fs2. The direction Fs2 is changed in the clockwise direction from the direction Fs1 by Δθ (e.g., 180°).

In the determination of step S8 in FIG. 6, for example, if "the direction of incidence of sunlight with respect to the vehicle 3" specified at the time point of the most recent process described above is θ as shown in FIG. 11, and "the direction of incidence of sunlight with respect to the vehicle 3" specified at the time point of S8 is θ+Δθ as shown in FIG. 12, and if Δθ is equal to or greater than the predetermined angle described above, it is determined as "Yes" in step S8, and then the process of step S9 is performed.

In this example, when changing the adjusting part in step S9, the control unit 11 specifies the range FA1 in the direction in which the target part exists when the reference position Bp is set as a reference, as shown in FIG. 11. The target part is a part already adjusted as a light-shielding part at a time point immediately before step S9, that is, the parts 41B and 41C in the light-adjusting member 7A in FIG. 11. Then, the range FA2 in the direction after change, which is obtained by changing the range FA1 specified in the above manner by the above change angle Δθ, is specified. Then, among the parts 41 existing in the range FA2 specified in this manner, the part 41 that does not satisfy the exclusion condition is determined as an adjusting target. In the example of FIG. 12, the part (41B, 41C in the light-adjusting member 7C) is determined as the adjusting target among the parts existing in the range FA2, excluding "the part whose area of a predetermined ratio (e.g., equal to or greater than 50%) is not included in the range FA2", "the part arranged on a front glass", and "the part that is not at the same height as the target part". Then, the transmittance of the part 41 determined as the adjusting target in this way is made the same as the transmittance of the target part at the time point before change (the time point immediately before step S9). Here, the transmittance of the target part is changed to the second range described above.

As described above, in the vehicle light-adjusting system 1, the light-adjusting member 7 is divided into a plurality of parts 41, and when the occupant gives an instruction designating any one of the parts 41, the individual transmittance of the part 41 corresponding to the instruction can be adjusted. Therefore, the occupant can more freely select a part where the adjustment of transmittance is desired. Furthermore, in the vehicle light-adjusting system 1 according to the present disclosure, an instruction designating any part 41 can be performed in a non-contact manner by at least one of gesture and word, so that the occupant can easily give the instruction.

Furthermore, according to the vehicle light-adjusting system 1, some or all the processes of the instruction detecting process by the instruction detecting unit 9 can be kept stopped until the occupant utters a predetermined word, so that power consumption can be suppressed. Furthermore, when the occupant wants the instruction detecting unit 9 to start detecting an instruction, the occupant merely needs to utter a predetermined word, and thus the occupant can easily start the detection of an instruction without involving complicated operation or a great change in posture.

For example, in a device in which a light-adjusting function is started by performing a plurality of operations on an operation unit such as a touch panel, the "operation required for starting a light-adjusting function" may impose a heavy burden on an occupant. However, according to the vehicle light-adjusting system 1 described above, the light-adjusting function can be started by speaking a predetermined word, and thus burden on the occupant is greatly reduced.

Moreover, according to the vehicle light-adjusting system 1, the occupant can instruct the part 41 whose individual transmittance is to be adjusted by pointing with a finger. Thus, the occupant can more easily give the instruction.

For example, in the device adopting an adjustment method in which one end of the light-adjusting unit is a fixed end and only the position of the other end is instructed as disclosed in Japanese Laid-Open Patent Publication No. 2017-159730, it is not possible to designate only an intermediate region away from both ends as an adjustment region, or designate only the side opposite to the fixed end as an adjustment region. However, such designations are possible according to the vehicle light-adjusting system 1 described above.

Furthermore, in the device as disclosed in Japanese Laid-Open Patent Publication No. 2017-159730 in which the position cannot be designated unless the finger is brought into contact with or in proximity to the light-adjusting unit, the occupant is required to move the fingertip to a predetermined position. However, in the vehicle light-adjusting system 1, a part can be designated by the direction in which the finger points. Therefore, restriction imposed on the position of the fingertip is greatly reduced, and the occupant can easily perform the operation of designating the part 41.

Furthermore, according to the vehicle light-adjusting system 1, even if the incidence state of the external light with respect to the vehicle 3 changes after the individual transmittance of the part 41 corresponding to the instruction of the occupant has been adjusted, the part whose individual transmittance is to be adjusted can be changed according to the change in the incidence state.

The examples described above or below are merely for illustrative purposes only and are not to be construed as limiting the present disclosure. Although the present disclosure has been described with reference to exemplary embodiments, it is to be understood that the language used in the description and the illustration of the present disclosure is descriptive and illustrative and not restrictive. As set forth herein, modifications may be made within the scope of the appended Claims without deviating from the scope or essence of the present disclosure in its form. Although reference has been made herein to specific structures, materials and examples in the detailed description of the present disclosure, it is not intended to limit the present disclosure to the disclosed matters herein, but rather the present disclosure is to cover all functionally equivalent structures, methods, and uses within the scope of the appended Claims.

The present disclosure is not limited to the embodiments described in detail above, and various modifications or changes can be made within the scope defined in the Claims of the present disclosure.

(1) In the embodiment described above, a car (automobile) is exemplified as the vehicle 3, but the vehicle light-adjusting system 1 may be applied to other vehicles, such as a train or a game vehicle serving as a ground vehicle, an airplane or a helicopter serving as a flying vehicle, a ship or a submarine serving as a marine or an underwater vehicle.

(2) In the embodiment described above, the example in which the information acquiring unit 15 constituted of the sensor group is arranged on the ceiling surface of the vehicle 3 has been described, but the installing location of the information acquiring unit 15 is not particularly limited. Furthermore, sensors can be respectively arranged at different locations.

(3) In the embodiment described above, the processes of steps S3 to S6 are performed in response to the input of the startup voice to the microphone 15A, but a condition serving as a trigger for shifting to the processes of steps S3 to S6 is not particularly limited to the above conditions. For example, it may be determined in step S2 whether or not a signal exceeding a predetermined sound pressure has been input to the microphone 15A, and when determined that a signal exceeding the predetermined sound pressure has been input, the processes of step S3 and subsequent steps may be performed, and when determined that a signal exceeding a predetermined sound pressure has not been input, the process may be returned to step S1. Alternatively, it may be determined in step S2 whether or not a predetermined switch has been pressed, and when determined that the predetermined switch has been pressed, the processes of step S3 and subsequent steps may be performed, and when determined that the predetermined switch has not been pressed, the process may be returned to step S1.

Figure 13:
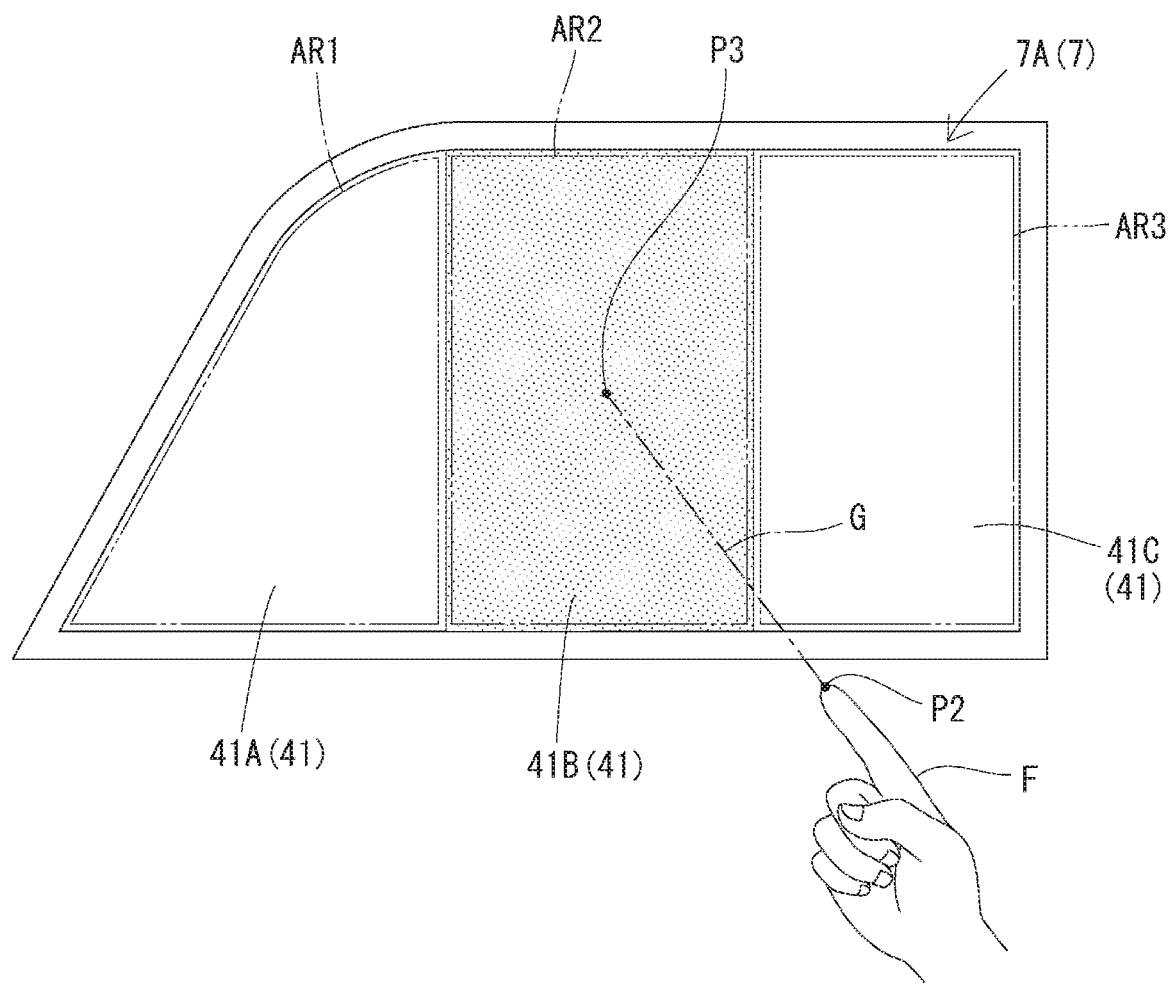
FIG. 13 is an explanatory view illustrating a state in which the individual transmittance of a part 41 is adjusted according to the direction in which the occupant's finger points, in a case where a light-adjusting member 7 is divided into a plurality of parts 41 by a dividing manner different from that of FIG. 3.

(4) In the embodiment described above, an example has been described in which the light-adjusting member 7 is divided into three parts 41 of the regions AR1, AR2, and AR3, but the manner of division is not particularly limited. For example, as shown in FIG. 13, the parts 41 may be provided side by side such that the light-adjusting member 7 is divided into the three regions, AR1, AR2, and AR3 in the lateral direction. In this case as well, the method of designating the part 41 and other controls can be performed in the same manner as in the embodiment described above. The area, shape, number of divisions, and the like of each of the plurality of parts 41 can be arbitrarily changed.

(5) In the embodiment described above, a non-contact instruction is a gesture by a finger, but may be a gesture by a part other than the finger. For example, a gesture by the palm of a hand pointing to a part to be designated may be used, and a gesture by the arm pointing to a part to be designated may be used. Alternatively, a gesture by the line of sight pointing to a part designated may be used.

(6) In the embodiment described above, a non-contact instruction has been described in which a part whose transmittance is to be adjusted is designated by a gesture, but a non-contact instruction in which a part to be adjusted is designated by words may be used. When anon-contact instruction bywords is adopted, apart may be designated by uttering the words including information that specify "a position of the target glass in the vehicle" and "a position of the designated part in the glass", such as "right front upper", "left rear middle". In this case, for example, when the occupant utters a voice of "right front upper" in step S3, the part 41A which is an upper part of the front-seat side window 5A is specified in step S5.

Alternatively, for example, identification information such as a number may be associated with all of the parts constituting the light-adjusting members 7, and a part may be designated by speaking any of the identification information by voice. For example, when a number is assigned such as "1" to the part 41A and "2" to the part 41B in the light-adjusting member 7A as shown in FIG. 3, the part may be specified by calling the number. In this case, for example, if the occupant utters a voice of "1" in step S3, the part 41A of the light-adjusting member 7A is designated in step S5.

(7) In the embodiment described above, the part specified as the instructed part in step S5 is controlled by the control method associated with the word recognized as the startup voice in step S2, but may be controlled by a predetermined control method. For example, when only the control method of "setting the transmittance to the first range" is defined, only the control of "setting the transmittance to the first range" may be performed in step S6 on the instructed part specified in step S5.

Figure 14:
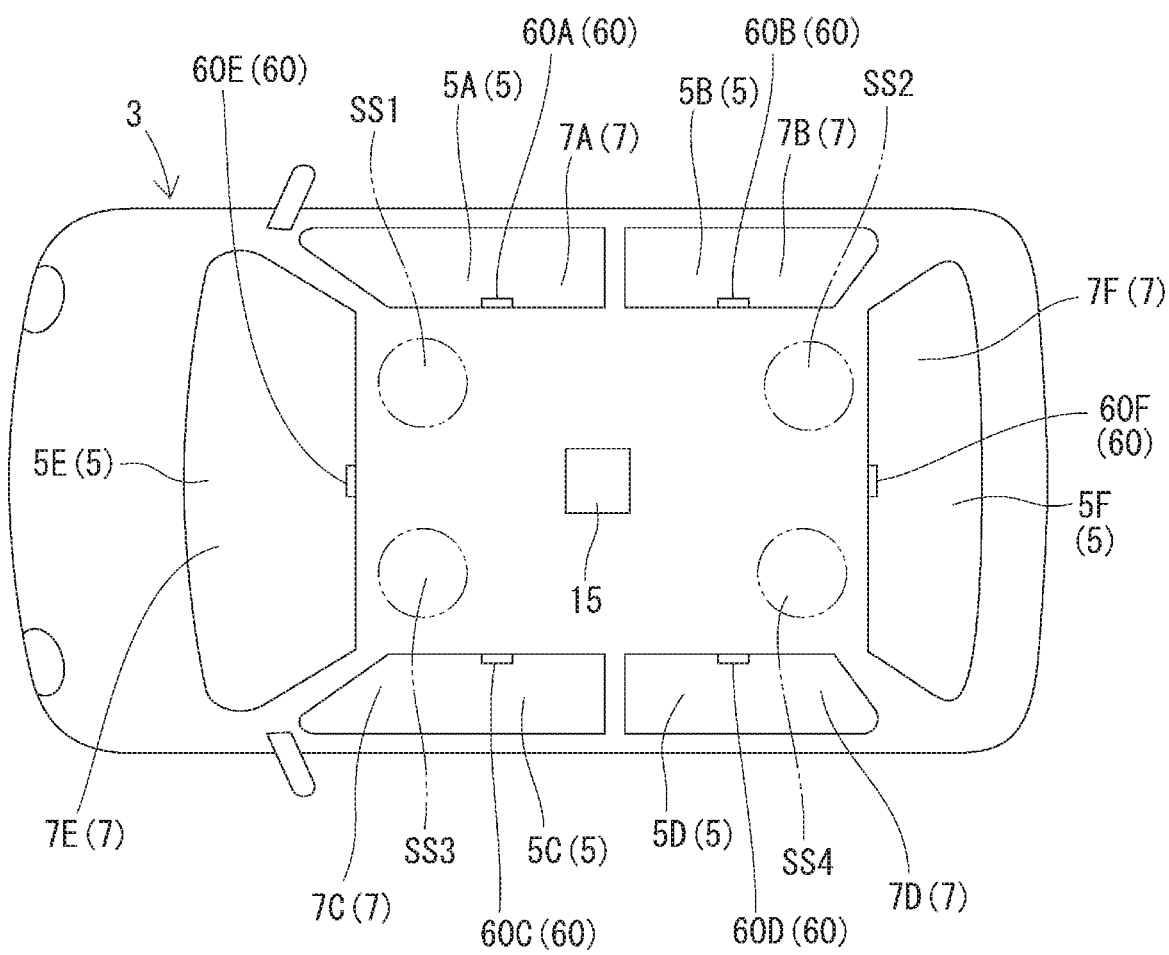
FIG. 14 is a schematic view of a configuration in which an illuminance sensor is added to the vehicle 3 of FIG. 1, as viewed from vertically above.

(8) In the embodiment described above, the incidence state of the external light (sunlight) with respect to the vehicle 3 is detected by the incidence state detecting unit 13 including the GPS sensor 13A and the control unit 11, but may be detected by another method. For example, as shown in FIG. 14, an illuminance sensor may be provided in the vicinity of each light-adjusting member 7, and it may be determined in step S8 whether or not the illuminance sensor having the largest illuminance has been changed among the illuminance sensors 60A to 60F. When the illuminance sensor has been changed, the process of step S9 may be performed such that, in the light-adjusting member 7 closest to the illuminance sensor detected as having the largest illuminance, a part at the same height as the part already adjusted is set as an adjusting target.

The invention claimed is:

1. A vehicle light-adjusting system to be mounted on a vehicle, the vehicle light-adjusting system comprising:
a light-adjusting member arranged in an incident portion which an external light enters;
an instruction detecting unit that detects an instruction given by an occupant in a non-contact manner to the light-adjusting member by gesture; and
a control unit that controls transmittance of the light-adjusting member, wherein
the light-adjusting member is divided into a plurality of parts,
when the instruction detecting unit detects the instruction designating any one of the parts, the control unit adjusts an individual transmittance of the part corresponding to the instruction detected by the instruction detecting unit,
the instruction detecting unit detects a pointing direction in which the occupant's finger points, and
the control unit adjusts the individual transmittance of the part located in the pointing direction detected by the instruction detecting unit.

2. The vehicle light-adjusting system according to claim 1, further comprising a voice recognition unit that recognizes a voice uttered by the occupant, wherein
the instruction detecting unit starts detecting the instruction when the voice recognition unit recognizes a predetermined word.

3. The vehicle light-adjusting system according to claim 1 further comprising an incidence state detecting unit that detects an incidence state of the external light with respect to the vehicle, wherein
after adjusting the individual transmittance of the part corresponding to the instruction detected by the instruction detecting unit, the control unit changes the part whose individual transmittance is to be adjusted according to a change in the incidence state detected by the incidence state detecting unit.

* * * * *